(12) United States Patent
Cho et al.

(10) Patent No.: US 11,639,084 B2
(45) Date of Patent: May 2, 2023

(54) BLOWER UNIT OF AIR CONDITIONER FOR VEHICLE

(71) Applicant: Hanon Systems, Daejeon (KR)

(72) Inventors: Hwan Kyu Cho, Daejeon (KR); Jae Woo Ko, Daejeon (KR); Jong Min Lee, Daejeon (KR); Gyu Ik Han, Daejeon (KR); Seong Yeol Yoon, Gyeonggi-do (KR)

(73) Assignee: HANON SYSTEMS, Daejeon (KR)

( * ) Notice: Subject to any disclaimer, the term of this patent is extended or adjusted under 35 U.S.C. 154(b) by 574 days.

(21) Appl. No.: 16/720,816

(22) Filed: Dec. 19, 2019

(65) Prior Publication Data
US 2020/0207180 A1 Jul. 2, 2020

(30) Foreign Application Priority Data
Dec. 26, 2018 (KR) .................. 10-2018-0169038

(51) Int. Cl.
*B60H 1/00* (2006.01)
*F04D 29/42* (2006.01)
(Continued)

(52) U.S. Cl.
CPC ....... *B60H 1/0055* (2013.01); *B60H 1/00528* (2013.01); *B60H 1/00871* (2013.01);
(Continued)

(58) Field of Classification Search
CPC .............. B60H 1/0055; B60H 1/00528; B60H 1/00871; B60H 1/26; F04D 29/281; F04D 29/424
See application file for complete search history.

(56) References Cited

U.S. PATENT DOCUMENTS 8,182,215 B2 * 5/2012 Ito ...................... F04D 25/166
 415/206
9,186,954 B2 * 11/2015 Ochiai ................ F04D 25/166
(Continued)

FOREIGN PATENT DOCUMENTS

DE 102012201712 A1 8/2012
DE 102016208081 A1 11/2016
(Continued)

OTHER PUBLICATIONS

Usine Chausson, FR 2,412,976 A1 English machine translation, Jul. 20, 1979 (Year: 1979).*
(Continued)

*Primary Examiner* — Vivek K Shirsat
(74) *Attorney, Agent, or Firm* — Dickinson Wright PLLC

(57) ABSTRACT

The present invention relates to a blower unit of an air conditioner for a vehicle, which can effectively prevent water from being introduced into a motor and has a motor housing and a blower wheel improved to smoothly perform cooling of the motor. The blower unit of a two-layered air conditioner for a vehicle, which can divide and inhale indoor air and outdoor air, includes: a scroll case having an upper passageway and a lower passageway; a first blower wheel disposed in the upper passageway; a second blower wheel disposed in the lower passageway and arranged below the first blower wheel; a blower motor for rotating the first blower wheel and the second blower wheel; and a motor housing for covering the blower motor, wherein a hub for guiding air is disposed on the second blower wheel, and the hub of the second blower wheel is partially overlapped with an end portion of the motor housing.

12 Claims, 16 Drawing Sheets

(51) Int. Cl.
   *F04D 29/28*     (2006.01)
   *B60H 1/26*      (2006.01)
(52) U.S. Cl.
   CPC ............ *B60H 1/26* (2013.01); *F04D 29/281* (2013.01); *F04D 29/424* (2013.01)

(56) References Cited

U.S. PATENT DOCUMENTS

2016/0305435 A1* 10/2016 Kamiya ................ H02K 7/003
2018/0023582 A1    1/2018 Park et al.

FOREIGN PATENT DOCUMENTS

| | | | | |
|---|---|---|---|---|
| FR | 2412976 A1 * | 7/1979 | ............... | H02K 5/24 |
| JP | 3900965 B2 | 4/2007 | | |
| KR | 200436612 Y1 | 9/2007 | | |
| WO | WO-2016066739 A1 * | 5/2016 | ......... | B60H 1/00471 |
| WO | 2018216965 A1 | 11/2018 | | |

OTHER PUBLICATIONS

Ailloud, et al., WO 2016/066739 A1 English machine translation, May 6, 2016 (Year: 2016).*

* cited by examiner

PRIOR ART

FIG. 12

| Spec. | 25℃ | | 85℃ | |
|---|---|---|---|---|
| | Measurement location ⓐ | Measurement location ⓑ | Measurement location ⓐ | Measurement location ⓑ |
| 1st embodiment | 33.7 | 32.9 | 112.1 | 111.3 |
| 2nd embodiment | 41.8 | 40.6 | 139.3 | 135.9 |
| 3rd embodiment | 39.4 | 37.5 | 125.9 | 121.6 |

BLOWER UNIT OF AIR CONDITIONER FOR VEHICLE

CROSS-REFERENCES TO RELATED APPLICATIONS

This application claims the benefit and priority of Korean Patent Application Serial No. 10-2018-0169038 filed Dec. 26, 2018, which is incorporated herein by reference in its entirety.

BACKGROUND OF THE INVENTION

Field of the Invention

The present invention relates to a blower unit of an air conditioner for a vehicle, and more particularly, to a blower unit of a two-layered air conditioner for a vehicle, which can secure defogging performance and maintain high heating performance during heating, and selectively inhale indoor air or outdoor air into an air-conditioning case.

Background Art

In general, an air conditioner for a vehicle is a device for heating or cooling the interior of the vehicle by introducing outdoor air to the interior of the vehicle or circulating indoor air to heat or cool. The air conditioner for a vehicle includes an evaporator for a cooling action which is disposed in an air-conditioning case, and a heater core for a heating action, and selectively sends air cooled or heated by the evaporator or the heater to parts of the interior of the vehicle.

Especially, a two-layered air conditioner has been developed in order to secure defogging performance and maintain high heating performance during heating. Cold outdoor air of low humidity is effective to defrost windows during traveling in a heating state, but it results in lowering indoor temperature.

The two-layered air conditioner realizes a two-layer air flow of indoor air and outdoor air to supply outdoor air to an upper part of a vehicle and circulate indoor air to a lower part of the vehicle in order to defog in the heating state, thereby effectively defrosting using fresh outdoor air of low humidity supplied to the upper part, offering fresh air to passengers, and maintaining high heating performance by supplying warm indoor air to the lower part.

Japanese Patent no. 3900965 (Jan. 12, 2007) discloses a blower unit of a two-layered air conditioner for a vehicle. FIG. 1 is a sectional view showing a blower unit of a conventional two-layered air conditioner for a vehicle.

As shown in FIG. 1, the blower unit of the conventional two-layered air conditioner for a vehicle includes a case 1, and the case 1 includes an indoor air inlet 11 for introducing indoor air and an outdoor air inlet 12 for introducing outdoor air. The case 1 further includes an indoor air door 43 for adjusting the degree of opening of the indoor air inlet 11 and an outdoor air door 44 for adjusting the degree of opening of the outdoor air inlet 12. An air filter 5 is disposed downstream of the indoor and outdoor air doors 43 and 44 in an air flow direction.

Dual fans 2 and 3 rotating by a motor are disposed downstream of the air filter 5, and a first blast passageway 15 and a second blast passageway 16 partitioned by a partition wall 14 of the case 1 are formed downstream of the dual fans 2 and 3. The indoor air door 43 and the outdoor air door 44 are rotated around a rotary shaft 41, and a partition plate 42 is formed integrally.

The partition plate 42 includes a first plate part 42a extending toward a circular arc side of the case 1 from the rotary shaft 41 and a second plate part 42b extending toward the air filter 5 from the rotary shaft 41. In a two-layered air flow mode, because the front end of the first plate part 42a is located between the indoor and outdoor air inlets 11 and 12, a channel for connecting the first blast passageway 15 with the indoor air inlet 11 and a channel for connecting the second blast passageway 16 with the outdoor air inlet 12 are partitioned from each other.

The blower unit of the conventional two-layered structure needs a watertight structure since water is introduced into the motor rotating the fan. Moreover, the blower unit of the conventional two-layered structure also needs a structure to block the introduction of water into the motor and to smoothly perform cooling of the motor.

PATENT LITERATURE

Patent Documents

Patent Document 1: Japanese patent No. 3900965 (Jan. 12, 2007)

SUMMARY OF THE INVENTION

Accordingly, the present invention has been made to solve the above-mentioned problems occurring in the prior arts, and it is an object of the present invention to provide a blower unit of an air conditioner for a vehicle, which can effectively prevent water from being introduced into a motor and has a motor housing and a blower wheel improved to smoothly perform cooling of the motor.

To accomplish the above object, according to the present invention, there is provided a blower unit of a two-layered air conditioner for a vehicle, which can divide and inhale indoor air and outdoor air, including: a scroll case having an upper passageway and a lower passageway; a first blower wheel disposed in the upper passageway; a second blower wheel disposed in the lower passageway and arranged below the first blower wheel; a blower motor for rotating the first blower wheel and the second blower wheel; and a motor housing for covering the blower motor, wherein a hub for guiding air is disposed on the second blower wheel, and the hub of the second blower wheel is partially overlapped with an end portion of the motor housing.

Moreover, the end portion of the motor housing is formed in a ring shape around the circumference of a rotary shaft of the blower motor to be spaced apart at a predetermined interval in the radial direction and has a partition wall shape extending upwardly.

Furthermore, the end portion of the motor housing is arranged to be spaced apart at a predetermined interval along the outer circumference or the inner circumference of the hub of the second blower wheel in the radial direction.

Additionally, the hub of the second blower wheel is spaced apart at a predetermined interval along the inner circumference of the second blower wheel and has a cylindrical shape of which the diameter gets smaller in a downward direction.

In addition, if the end portion of the motor housing is arranged outside the hub of the second blower wheel, the motor housing is formed to open a cooling hole for cooling the blower motor.

Moreover, if the end portion of the motor housing is arranged inside the hub of the second blower wheel, the motor housing is formed to cover the cooling hole for cooling the blower motor.

Furthermore, the hub of the second blower wheel includes a blade.

Additionally, the motor housing is formed to cover the cooling hole for cooling the blower motor.

In another aspect of the present invention, there is provided a blower unit of a two-layered air conditioner for a vehicle, which can divide and inhale indoor air and outdoor air, including: a scroll case having an upper passageway and a lower passageway; a first blower wheel disposed in the upper passageway; a second blower wheel disposed in the lower passageway and arranged below the first blower wheel; a hub disposed on the second blower wheel to guide air; and a blade disposed on the hub of the second blower wheel.

Moreover, the blade extends radially and outwardly in a radial direction from the center of rotation of the hub.

Furthermore, a blower motor for rotating the first blower wheel and the second blower wheel is disposed, and the blade extends radially toward the inner wall surface of the hub from a rotary shaft insertion hole to which a rotary shaft of the blower motor is inserted.

Additionally, the blade is formed to be curved in a streamlined shape to be aligned with a curved direction of wings of the second blower wheel.

In a further aspect of the present invention, there is provided a blower unit of a two-layered air conditioner for a vehicle, which can divide and inhale indoor air and outdoor air, including: a scroll case having an upper passageway and a lower passageway; a first blower wheel disposed in the upper passageway; a second blower wheel disposed in the lower passageway and arranged below the first blower wheel; a blower motor for rotating the first blower wheel and the second blower wheel; and a motor housing for covering the blower motor, wherein the motor housing is formed to cover a cooling hole for cooling the blower motor.

Moreover, the cooling hole is formed to expose and cool a stator of the blower motor.

Furthermore, a plurality of the cooling holes are formed on the upper surface of the motor housing to be spaced apart at a predetermined interval in a radial direction around the circumference of the rotary shaft of the blower motor, and the motor housing extends inwardly in the radial direction from the partition wall of the motor housing located outside the cooling holes in the radial direction in order to cover upper portions of the cooling holes.

Additionally, a hub for guiding air upwardly is disposed on the second blower wheel, and a blade for blowing air downwardly is disposed on the hub of the second blower wheel.

The blower unit of the air conditioner for a vehicle according to the present invention can effectively prevent water from being introduced into the blower motor, enhance durability of the blower motor by smoothly performing cooling of the motor and prevent a damage of the blower motor due to infiltration of water.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 12 is a view showing temperature evaluations at different measurement locations of the blower motors according to the first to third preferred embodiment of the present invention;

DETAILED DESCRIPTION OF THE PREFERRED EMBODIMENT

Hereinafter, with reference to the attached drawings, a technical structure of a blower unit of an air conditioner for a vehicle according to a preferred embodiment of the present invention will be described in detail.

Figure 1:
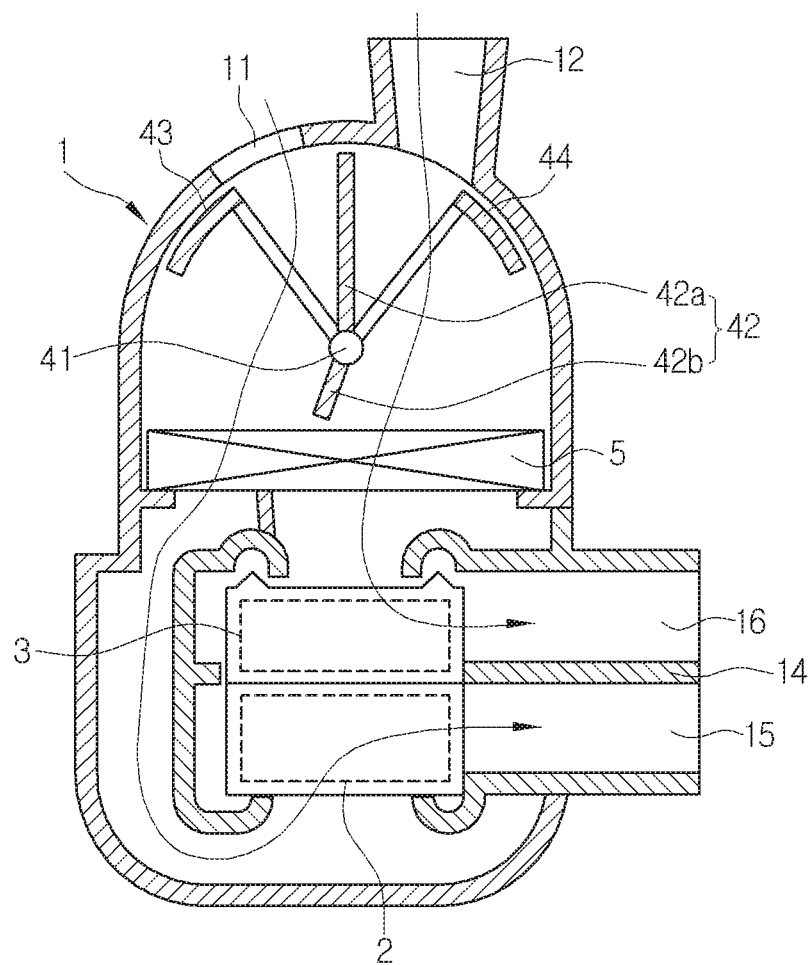
FIG. 1 is a sectional view showing a blower unit of a conventional two-layered air conditioner for a vehicle.
Figure 2:
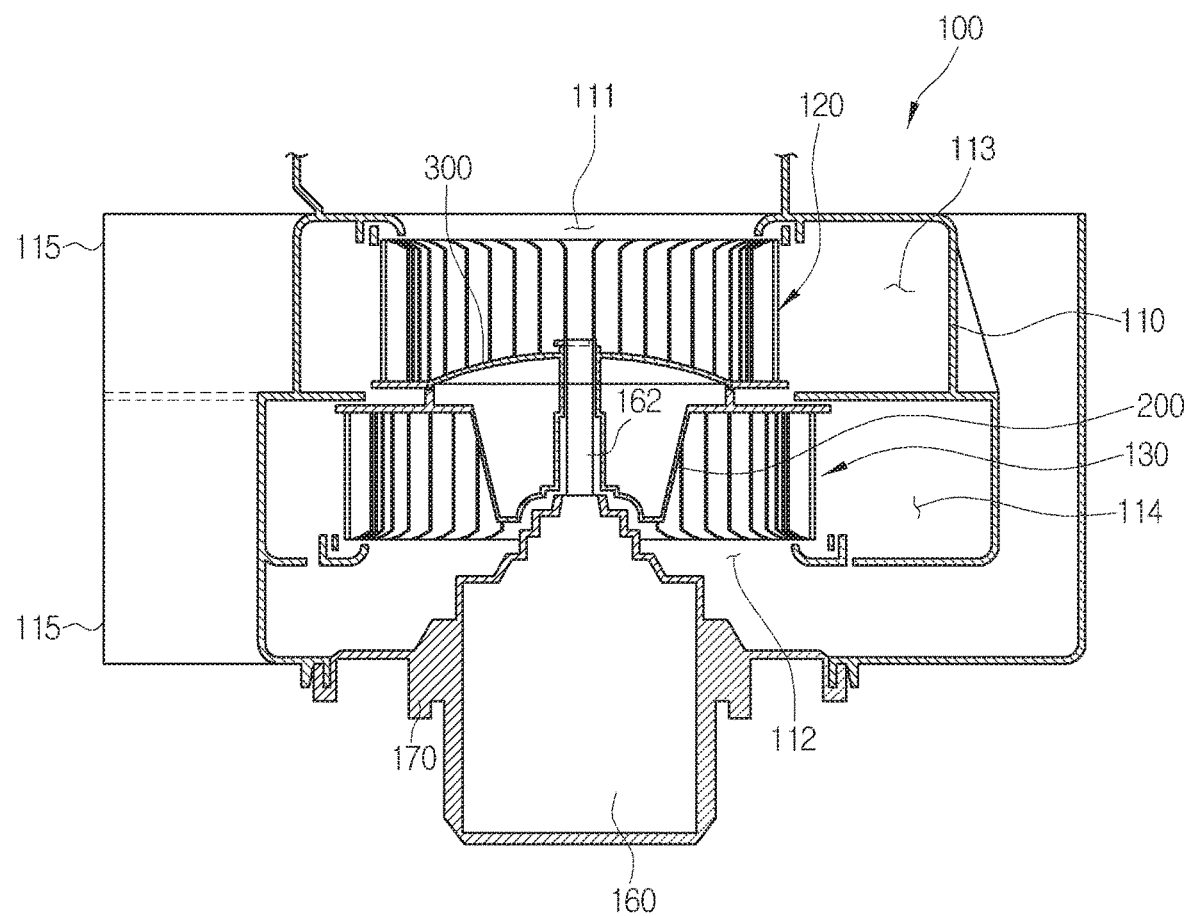
FIG. 2 is a sectional view showing a blower unit of an air conditioner for a vehicle according to a first preferred embodiment of the present invention.
Figure 3:
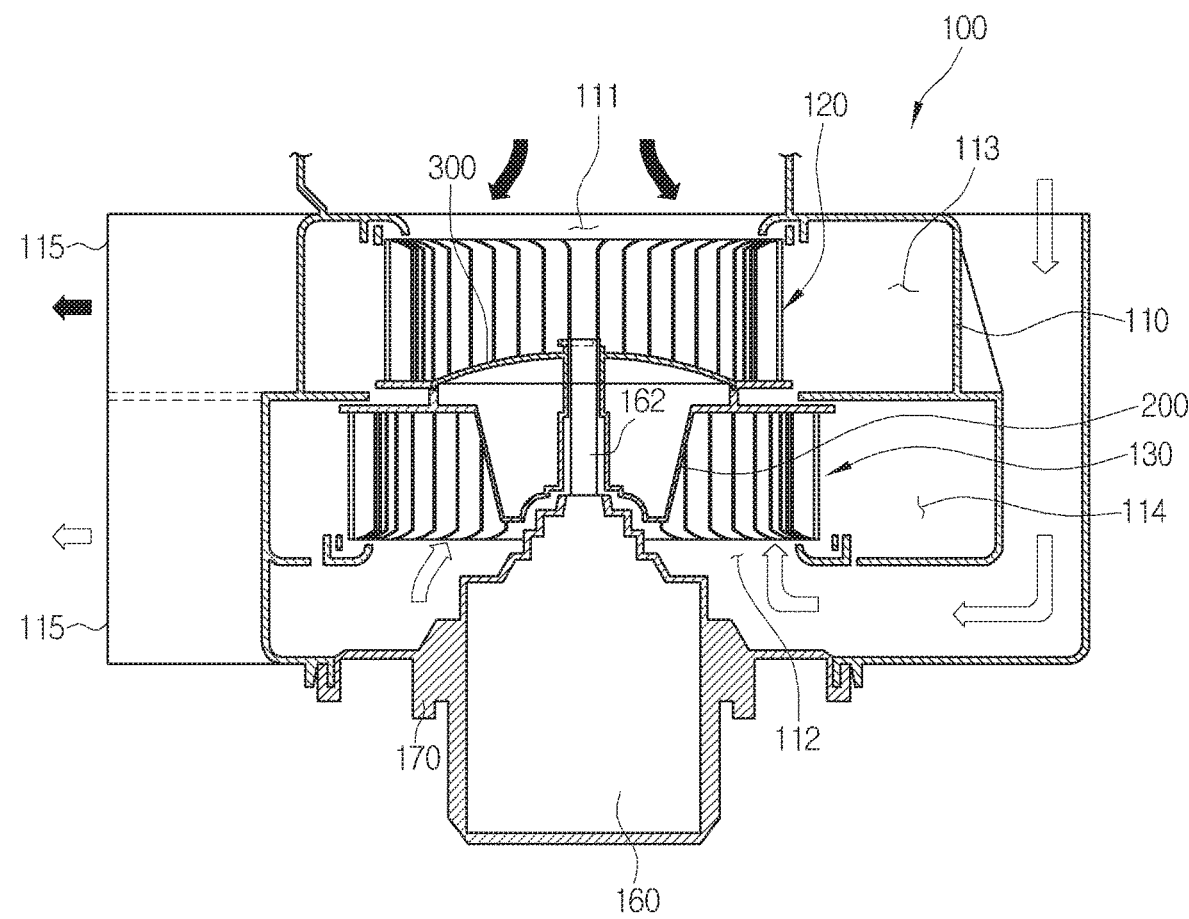
FIG. 3 is a view showing a flow of air in FIG. 2.
Figure 4:
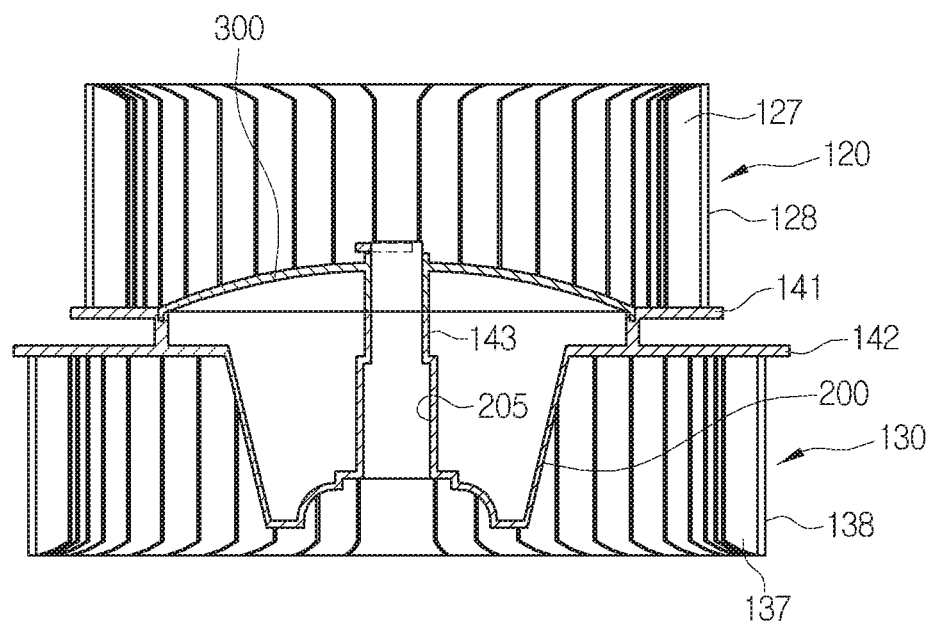
FIG. 4 is an enlarged view of a blower wheel according to the first preferred embodiment of the present invention.
Figure 5:
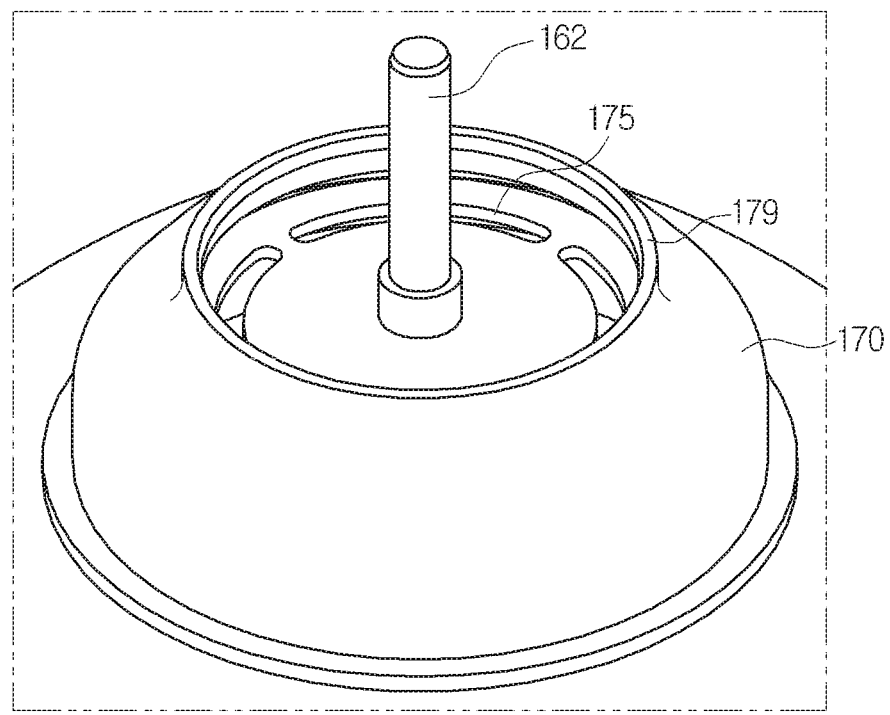
FIG. 5 is a perspective view showing a motor housing according to the first preferred embodiment of the present invention.
Figure 6:
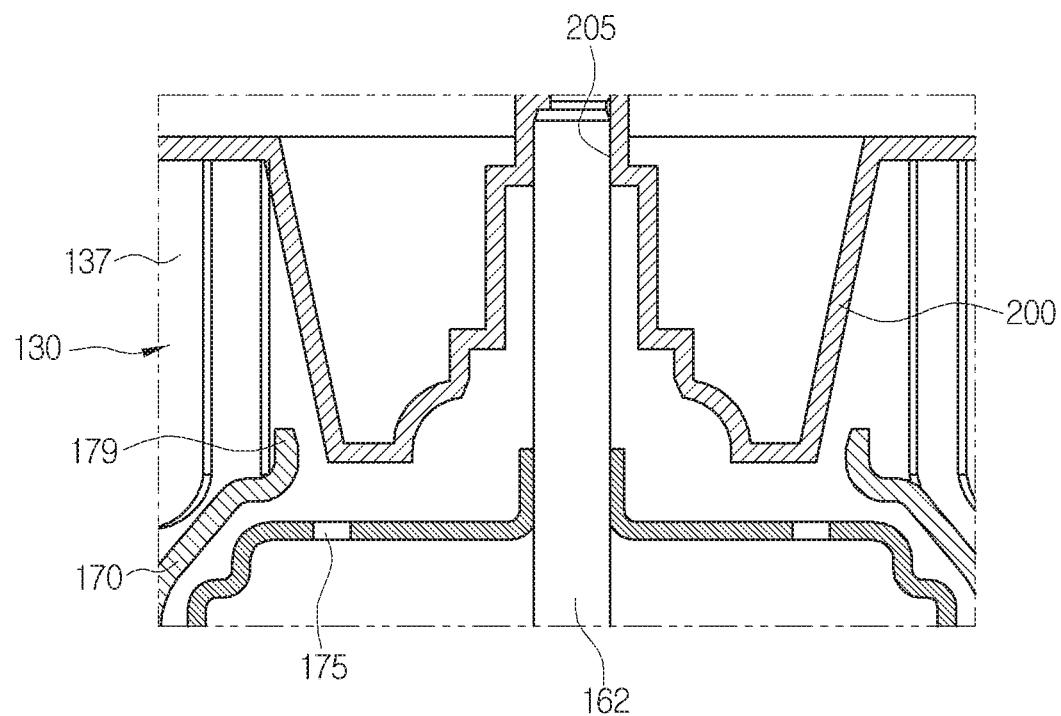
FIG. 6 is a sectional view showing a combined state between the motor housing and a hub according to the first preferred embodiment of the present invention.

FIG. 2 is a sectional view showing a blower unit of an air conditioner for a vehicle according to a first preferred embodiment of the present invention, FIG. 3 is a view showing a flow of air in FIG. 2, FIG. 4 is an enlarged view of a blower wheel according to the first preferred embodiment of the present invention, FIG. 5 is a perspective view showing a motor housing according to the first preferred embodiment of the present invention, and FIG. 6 is a sectional view showing a combined state between the motor housing and a hub according to the first preferred embodiment of the present invention.

Hereinafter, the vertical direction of FIG. 2 is an axial direction, and the lateral direction is a radial direction.

Referring to FIGS. 2 to 6, the blower unit 100 of the air conditioner for a vehicle according to the first preferred embodiment of the present invention having a two-layered structure to divide and inhale indoor air and outdoor air includes a scroll case 110, a first blower wheel 120, a second blower wheel 130, a blower motor 160, a motor housing 170, and a hub 200.

The scroll case 110 has a first inlet 111 for inhaling outdoor air and a second inlet 112 for inhaling indoor air. The scroll case 110 includes: an upper passageway 113 through which the outdoor air introduced into the first inlet 111 flows and a lower passageway 114 through which the indoor air introduced into the second inlet 112 flows. An intake unit is combined with an upper portion of the scroll case 110. The intake unit includes an indoor air inlet, an outdoor air inlet, and an indoor and outdoor air converting door for selectively introducing indoor air and outdoor air.

The first inlet 111 is opened toward an upper part and the second inlet 112 is opened toward a lower part. The upper passageway 113 and the lower passageway 114 are formed in a scroll shape. An end portion 115 of the scroll case 110 is opened and connected with an air-conditioning unit. The scroll case 110 includes an upper case forming the upper passageway 113 and a lower case forming the lower passageway 114, and the upper case and the lower case are vertically combined with each other to be integrated with each other.

The upper passageway 113 and the lower passageway 114 are partitioned from each other by the upper case and the lower case. The upper case is opened upwardly through the first inlet 111 and the lower case is opened downwardly through the second inlet 112. In a state where the upper case and the lower case are combined with each other in a vertical direction, the first inlet 111 are opposed to each other. The scroll case 110 forms a channel at one side of an outer face in a lateral direction of the upper case and the lower case.

Referring to FIG. 3, the outdoor air introduced through the outdoor air inlet moves downwardly as indicated by a colored arrow, and then, directly moves toward the upper passageway 113 through the first inlet 111. Furthermore, the indoor air introduced through the indoor air inlet moves downwardly through an outer passageway in the lateral direction as indicated by a colorless arrow, moves horizontally along the bottom surface of the scroll case 110, and then, moves to the lower passageway 114 through the second inlet 112.

The first blower wheel 120 is disposed in the upper passageway 113 to inhale the air from the first inlet 111 in a vertical direction (axial direction) and blow the air in the horizontal direction (radial direction). The second blower wheel 130 is disposed in the lower passageway 114 to inhale the air from the second inlet 112 in the vertical direction (axial direction) and blow the air in the horizontal direction (radial direction). That is, the air is inhaled in the axial direction by rotation of the first blower wheel 120 and the second blower wheel 130, is blown in the radial direction, and is moved to the air-conditioning unit. The second blower wheel 130 is arranged below the first blower wheel 120. The first blower wheel 120 and the second blower wheel 130 are centrifugal type fans.

The first blower wheel 120 includes a plurality of wings 127 arranged in a ring shape along the circumference of the first body 141 of a disc shape, and an edge 128 for connecting and fixing a plurality of the wings 127. The second blower wheel 130 includes a plurality of wings 137 arranged in a ring shape along the circumference of the second body 142 of a disc shape, and an edge 138 for connecting and fixing a plurality of the wings 137. The first body 141 and the second body 142 are combined with each other integrally, and are connected with a central portion through a boss 143. A rotary shaft insertion hole 205 to which a rotary shaft 162 of the blower motor 160 is inserted is formed in the boss 143.

The blower motor 160 is to rotate the first blower wheel 120 and the second blower wheel 130. The rotary shaft 162 of the blower motor 160 is inserted into the rotary shaft insertion hole 205 of the hub 200 which will be described later, and the first blower wheel 120 and the second blower wheel 130 are rotated together with the rotary shaft 162 by rotation of the blower motor 160. The motor housing 170 covers the blower motor 160.

The hub 200 is disposed on the second blower wheel 130 to guide air. The hub 200 includes a cylindrical member and is disposed on the second blower wheel 130 in order to guide the air, which is inhaled in the axial direction through the second inlet 112, in the radial direction. The hub 200 guides the wind inhaled to the second inlet 112 so that the wind can be discharged to the wings of the second blower wheel 130 without leaning, and acts as a flow control element to make air inhaled by the second blower wheel 130 rapidly. Another hub 300 may be added to the first blower wheel 120.

The hub 200 of the second blower wheel is partially overlapped with an end portion 179 of the motor housing 170. That is, a lower end portion of the hub 200 and an upper end portion of the motor housing 170 are overlapped vertically. As described above, the hub 200 and the upper end portion 179 of the motor housing 170 are overlapped in order to prevent water from being introduced between the second blower wheel 130 and the motor housing 170.

The end portion 179 of the motor housing 170 is formed in a ring shape around the circumference of the rotary shaft 162 of the blower motor 160 to be spaced apart at a predetermined interval in the radial direction and has a partition wall shape extending upwardly. Because the end portion 179 of the motor housing 170 extends upwardly, the hub 200 of the second blower wheel and the motor housing 170 may be easily overlapped. Such a structure does not require additional combining work, and can be easily achieved by partially changing a mold of the motor housing.

The end portion 179 of the motor housing 170 is arranged along the outer circumference or the inner circumference of the hub 200 of the second blower wheel to be spaced apart at a predetermined interval. The hub 200 of the second blower wheel is spaced apart at a predetermined interval along the inner circumference of the second blower wheel 130, and has a cylindrical shape of which the diameter gets smaller in a downward direction.

In the first preferred embodiment, the end portion 179 of the motor housing 170 is arranged on the outer face of the hub 200 of the second blower wheel in the radial direction. As described above, if the end portion 179 of the motor housing 170 is arranged on the outer face of the hub 200 of the second blower wheel in the radial direction, the motor housing 170 is formed to open a cooling hole 175. The cooling hole 175 is to cool the blower motor 160, and may be formed in the motor housing 170. The cooling hole 175 connects the blower motor 160 with the channel of the scroll case 110 so that the blower motor 160 exchanges heat with the air in the scroll case 110.

As shown in FIGS. 5 and 6, if the end portion 179 of the motor housing 170 is arranged on the outer face of the hub 200 of the second blower wheel in the radial direction, the diameter of the end portion 179 is larger than the diameter of the lower end portion of the hub 200. The end portion 179 of the motor housing 170 is located outside the cooling hole 175 in the radial direction, and the cooling hole 175 is exposed to the lower passageway 114 in which the hub 200 is located in an upward direction.

Such a structure provides a watertight structure that the cooling hole 175 smoothly exchanges heat with the air in the channel of the scroll case 110 to sufficiently perform cooling of the blower motor 160 and infiltration of water can be prevented effectively.

Figure 7:
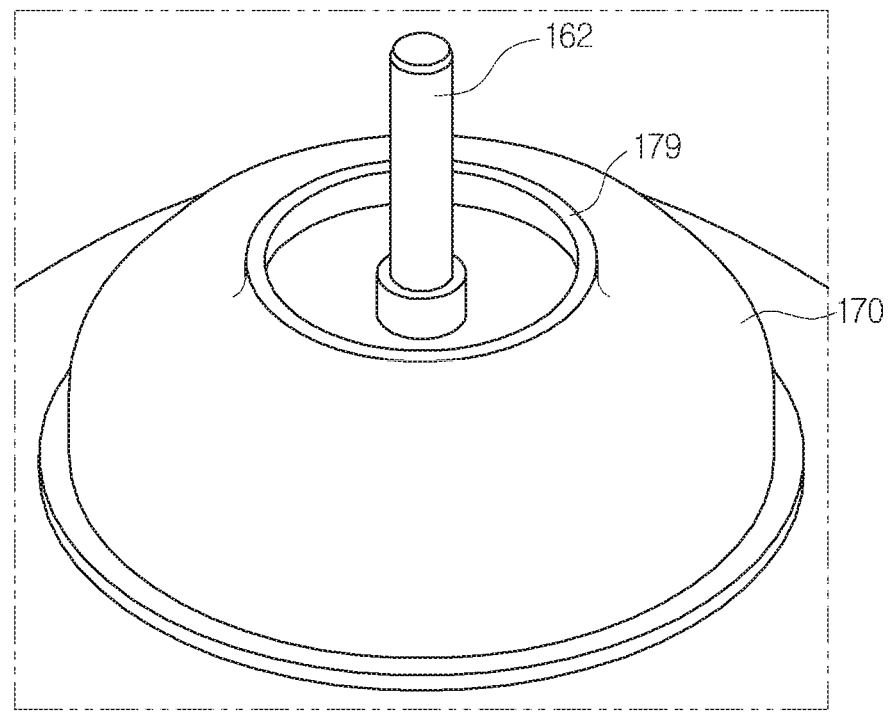
FIG. 7 is a perspective view showing a motor housing according to a second preferred embodiment of the present invention.
Figure 8:
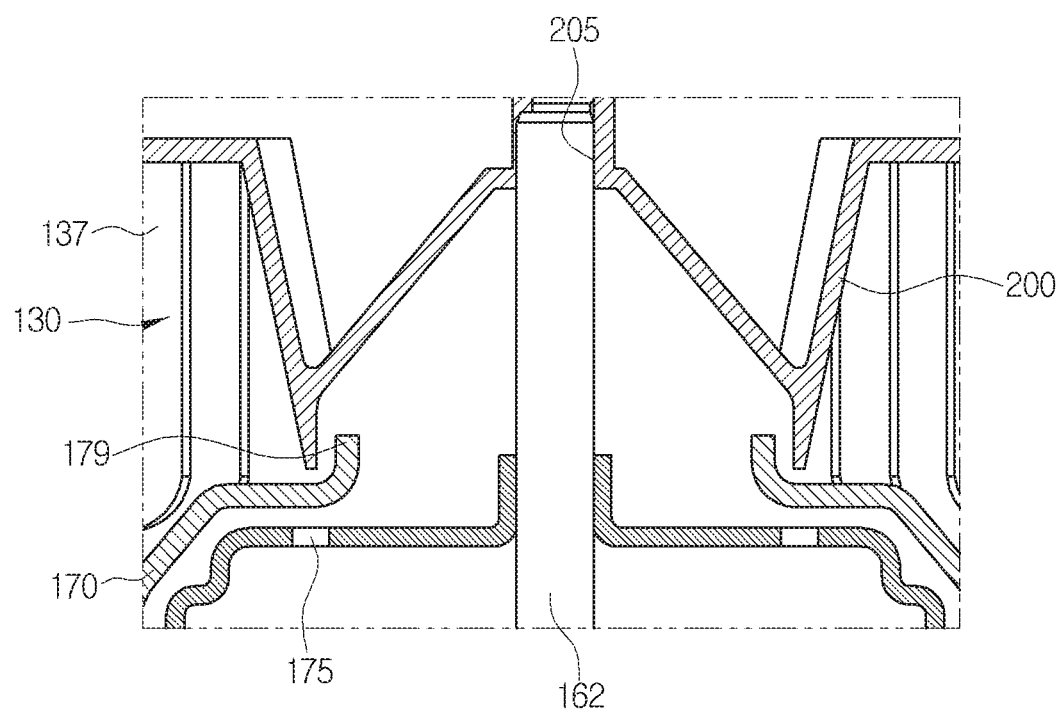
FIG. 8 is a sectional view showing a combined state between the motor housing and a hub according to the second preferred embodiment of the present invention.

FIG. 7 is a perspective view showing a motor housing according to a second preferred embodiment of the present invention, and FIG. 8 is a sectional view showing a combined state between the motor housing and a hub according to the second preferred embodiment of the present invention.

Referring to FIGS. 7 and 8, the blower unit of the air conditioner for a vehicle according to the second preferred embodiment of the present invention has a motor housing 170 more improved than that of the first preferred embodiment. The hub 200 of the second blower wheel is partially overlapped with the end portion 179 of the motor housing 170. The end portion 179 of the motor housing 170 is formed in a ring shape around the circumference of the rotary shaft 162 of the blower motor 160 to be spaced apart at a predetermined interval in the radial direction and has a partition wall shape extending upwardly.

In the second preferred embodiment, the end portion 179 of the motor housing 170 is arranged on the inner face of the hub 200 of the second blower wheel in the radial direction. As described above, if the end portion 179 of the motor housing 170 is arranged on the inner face of the hub 200 of the second blower wheel in the radial direction, the motor housing 170 is formed to cover the cooling hole 175.

When the end portion 179 of the motor housing 170 is arranged on the inner face of the hub 200 of the second blower wheel in the radial direction, the diameter of the end portion 179 is smaller than the diameter of the lower end portion of the hub 200. The end portion 179 of the motor housing 170 is located inside the cooling hole 175 in the radial direction, and the cooling hole 175 is not exposed to the outside by being covered by the motor housing 170 upwardly.

The cooling hole 175 is formed to expose and cool a stator of the blower motor 160. That is, a plurality of the cooling holes 175 are formed on the upper surface of the blower motor 160, and are formed to be spaced apart from one another at a predetermined interval in the radial direction along the circumference of the rotary shaft 162 of the blower motor 160. The motor housing 170 covers upper portions of the cooling holes 175 by extending the end portion 179 of the motor housing 170 located above the cooling holes 175 in the radial direction inward.

Such a structure prevents water from infiltrating into the blower motor 160 through the cooling holes 175. Because the blower unit of the two-layered air conditioner uses all of the upper passageway and the lower passageway, if water is introduced over the lower passageway 114, it is quite probable that the water infiltrates into the blower motor 160 by passing the outer circumferential surface of the hub 200 or getting over the partition wall of the end portion 179 of the motor housing 170. Because the end portion 179 of the motor housing 170 is formed to be overlapped with the hub 200 and the motor housing 170 is formed to cover the cooling holes 175, it can perfectly prevent water from being introduced into the blower motor 160.

Figure 9:
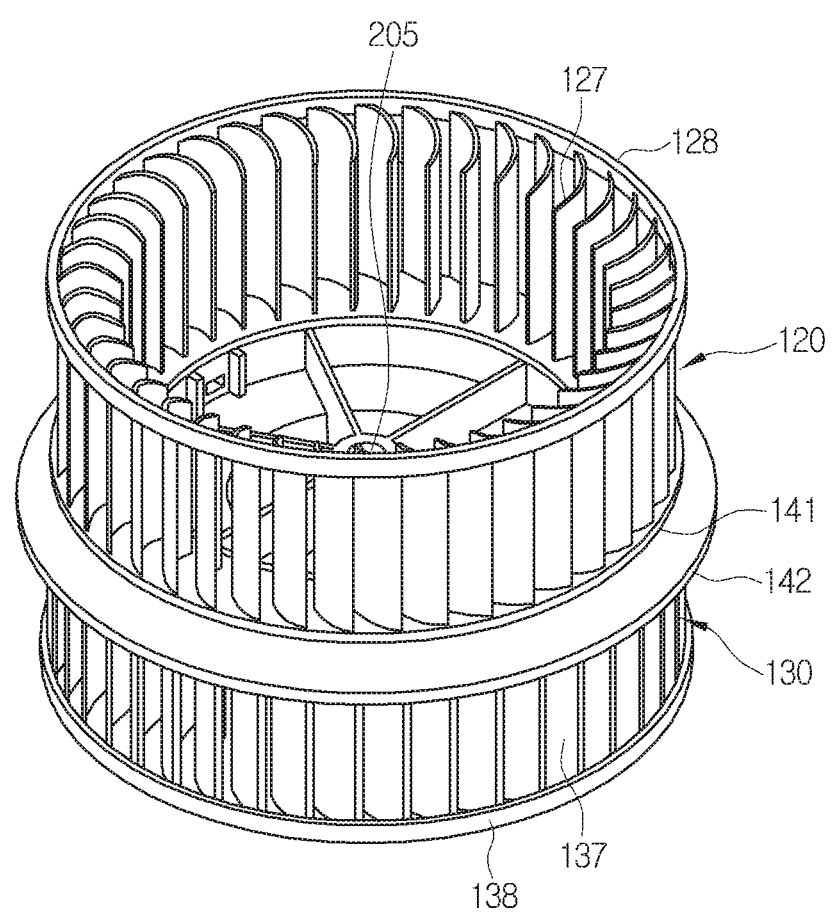
FIG. 9 is a perspective view of a front side of a blower wheel according to a third preferred embodiment of the present invention.
Figure 10:
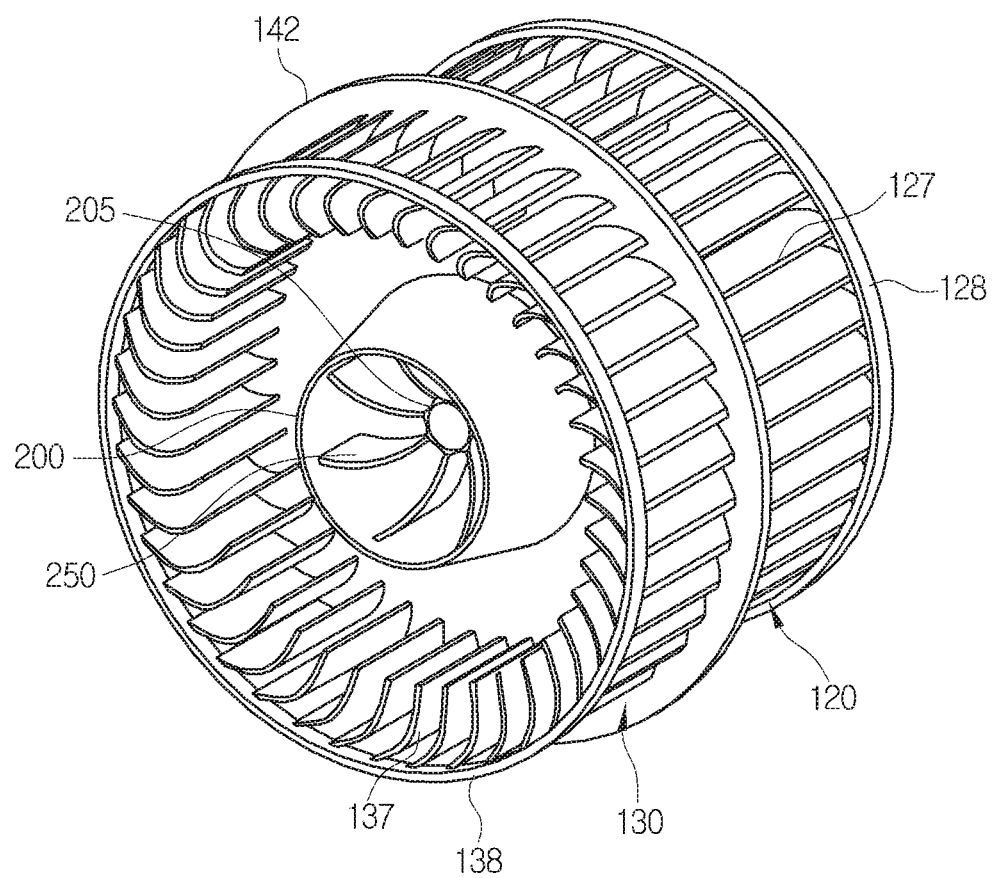
FIG. 10 is a perspective view of a rear side of the blower wheel according to the third preferred embodiment of the present invention.
Figure 11:
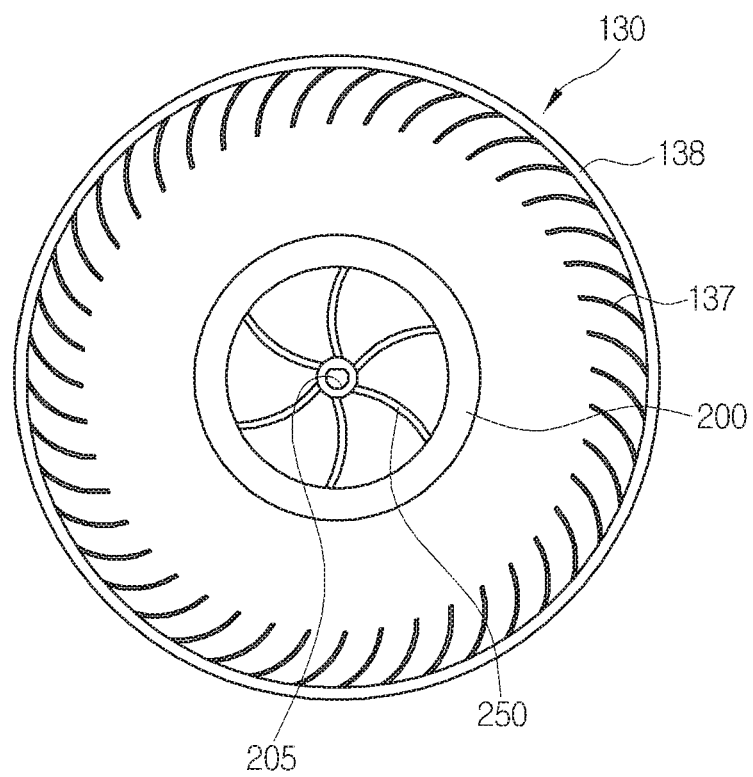
FIG. 11 is a rear view of a second blower wheel according to the third preferred embodiment of the present invention.

FIG. 9 is a perspective view of a front side of a blower wheel according to a third preferred embodiment of the present invention, FIG. 10 is a perspective view of a rear side of the blower wheel according to the third preferred embodiment of the present invention, and FIG. 11 is a rear view of a second blower wheel according to the third preferred embodiment of the present invention.

Referring to FIGS. 9 to 11, the blower unit of the air conditioner for a vehicle according to the third preferred embodiment of the present invention includes a hub 200 more improved than that of the second preferred embodiment. In the third preferred embodiment, the structures of the first blower wheel 120, the second blower wheel 130 and the motor housing 170 are the same as those of the second preferred embodiment.

The first blower wheel 120 includes a plurality of wings 127 arranged in a ring shape along the circumference of the first body 141 of a disc shape, and an edge 128 for connecting and fixing a plurality of the wings 127. The second blower wheel 130 includes a plurality of wings 137 arranged in a ring shape along the circumference of the second body 142 of a disc shape, and an edge 138 for connecting and fixing a plurality of the wings 137. The first body 141 and the second body 142 are combined with each other integrally, and a rotary shaft insertion hole 205 to which a rotary shaft 162 of the blower motor 160 is inserted is formed.

The second blower wheel 130 has the hub 200. The hub 200 guides air upwardly, so that indoor air is smoothly inhaled to the lower passageway 114. A blade 250 is disposed on the hub 200 of the second blower wheel. The blade 250 extends radially and outwardly in the radial direction from the center of rotation of the hub 200. In more detail, the blade 250 radially extends toward the inner wall surface of the hub 200 from the rotary shaft insertion hole 205.

The blade 250 blows inner air of the hub 200 in the downward direction when the second blower wheel is rotated. Preferably, the blade 250 is formed to be curved in a streamlined shape to be aligned with a curved direction of the wings 137 of the second blower wheel 130. Referring to FIG. 11, the curved direction of the blade 250 is the same as the curved direction of the wings 137 of the second blower wheel 130.

The blade 250 is formed at a lower end portion of the hub 200 to be in an impeller shape so as to control a rise of temperature of the blower motor by improving a cooling flow. As described above, the end portion of the motor housing is formed to be overlapped with the hub 200 so that the motor housing covers the cooling holes. Additionally, the hub 200 has a blade 250 at the lower end portion in order to enhance the watertight structure and sufficiently perform a cooling function of the blower motor.

Figure 13:
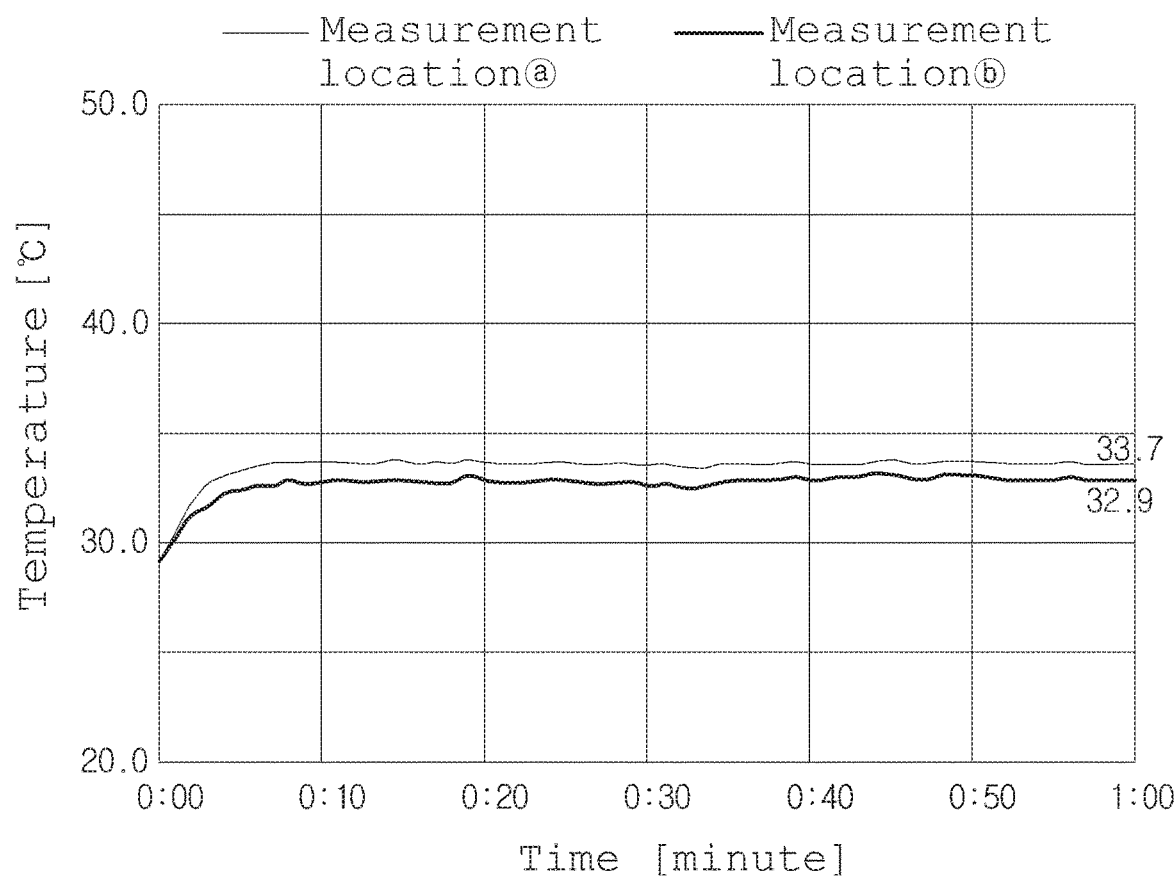
FIGS. 13 and 14 are graphs showing the temperature evaluations according to the first preferred embodiment of the present invention.
Figure 14:
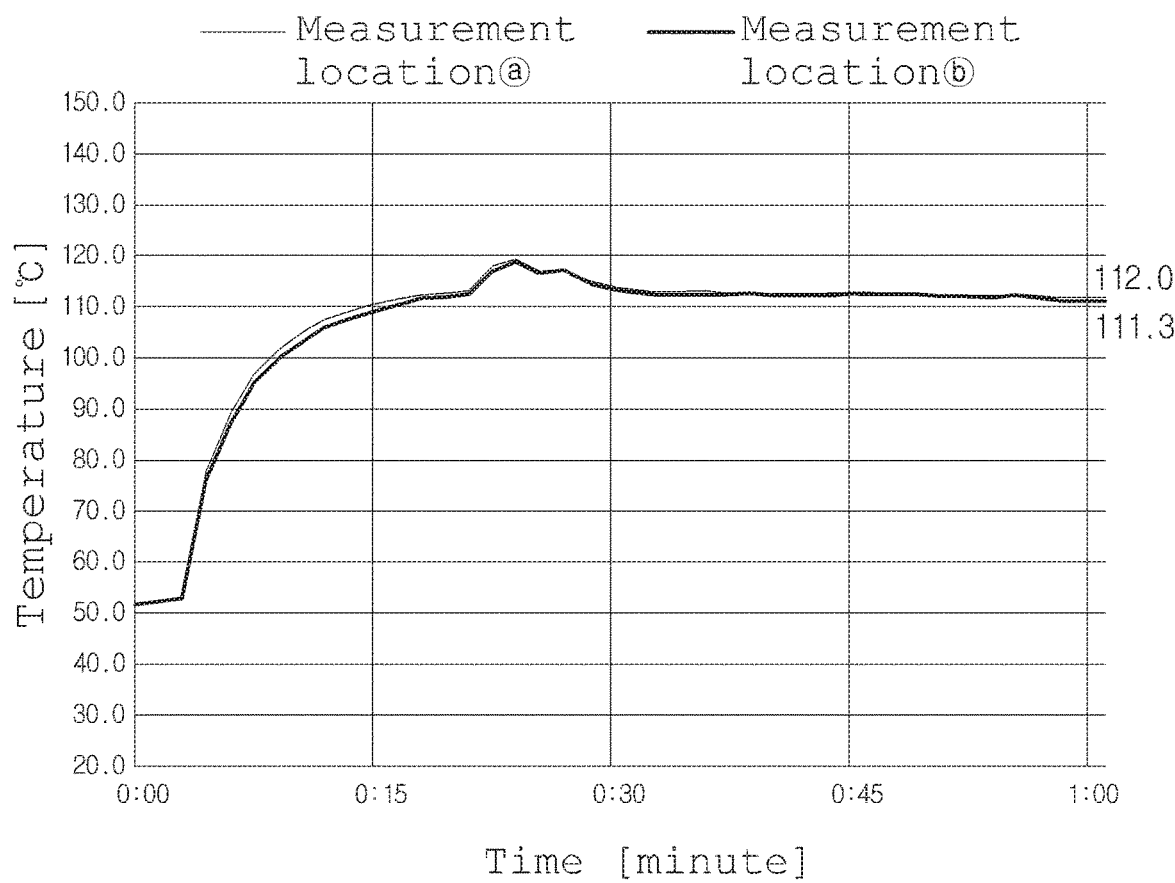
Figure 15:
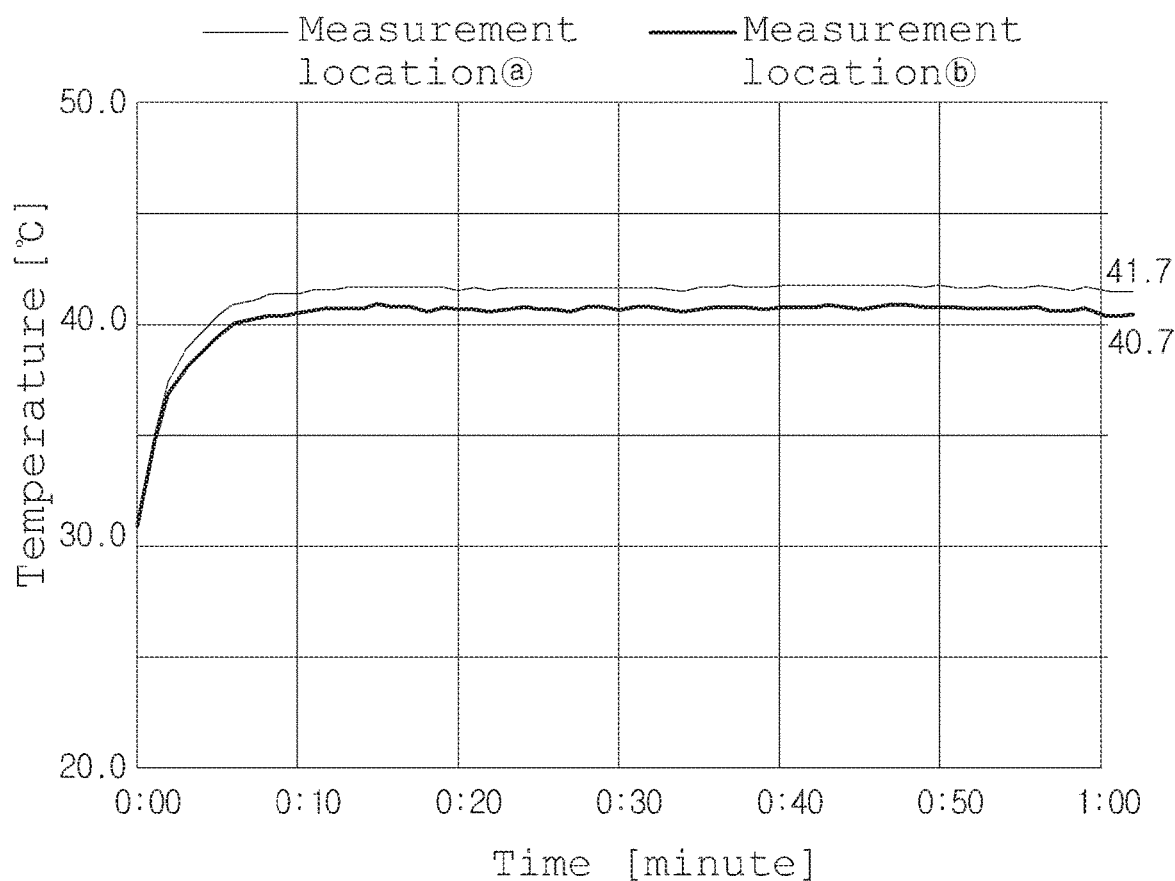
FIGS. 15 and 16 are graphs showing the temperature evaluations according to the second preferred embodiment of the present invention.
Figure 16:
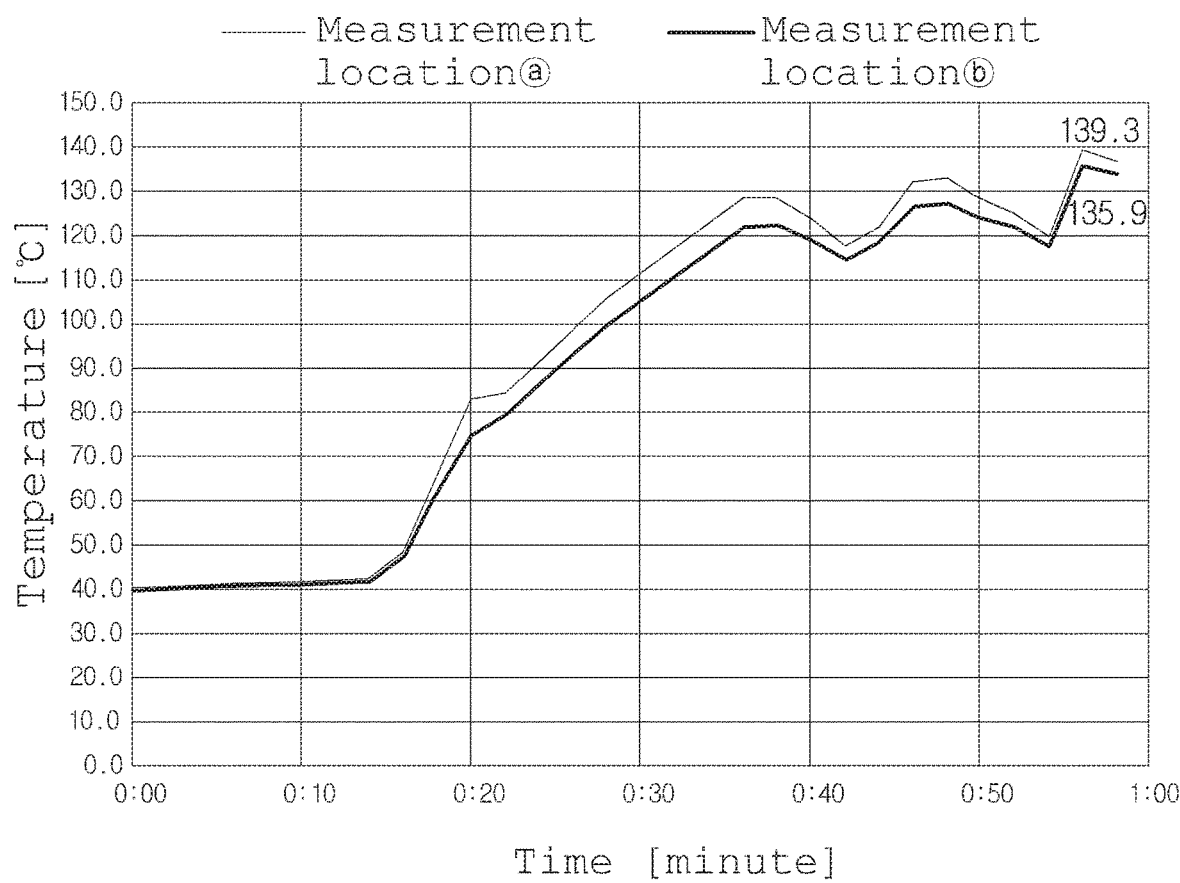
Figure 17:
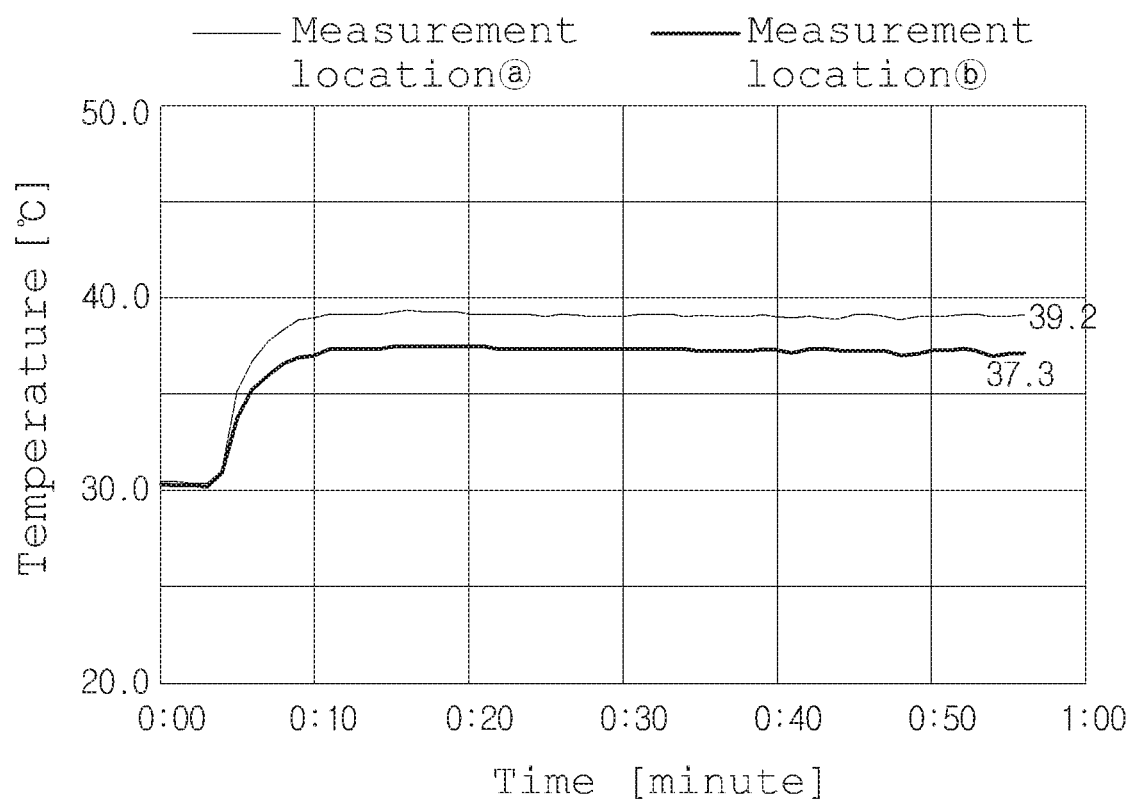
FIGS. 17 and 18 are graphs showing the temperature evaluations according to the third preferred embodiment of the present invention.
Figure 18:
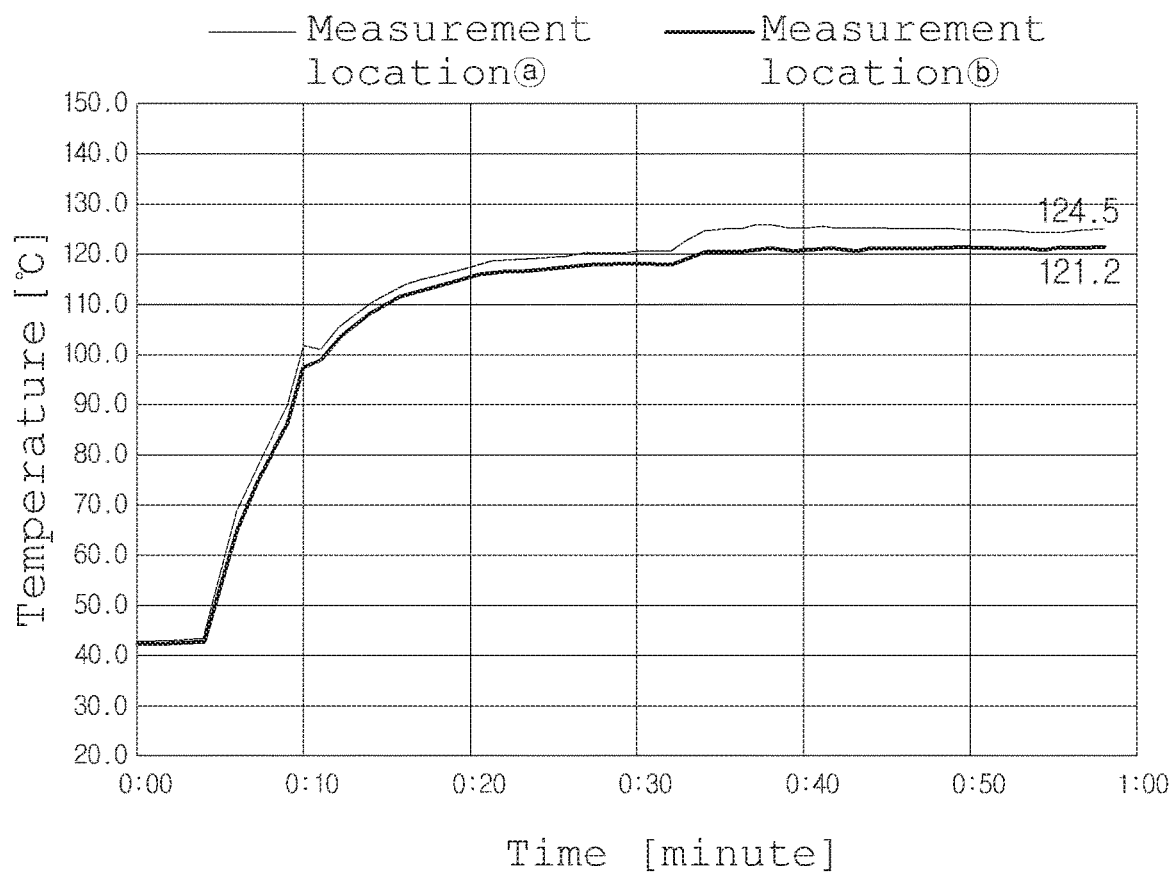

FIG. 12 is a view showing temperature evaluations at different measurement locations of the blower motors according to the first to third preferred embodiment of the present invention, FIGS. 13 and 14 are graphs showing the temperature evaluations according to the first preferred embodiment of the present invention, FIGS. 15 and 16 are graphs showing the temperature evaluations according to the second preferred embodiment of the present invention, and FIGS. 17 and 18 are graphs showing the temperature evaluations according to the third preferred embodiment of the present invention.

Referring to FIGS. 12 to 18, temperature evaluation was carried out at different measurement locations of the blower motor. The temperature measurement locations are stators of the blower motor, and temperature was measured at locations (a) and (b) which face each other. Temperatures were measured at 25° C. and 85° C. for an hour.

In the first preferred embodiment, based on 25° C., temperature of the measurement location (a) was 33.7° C. and temperature of the measurement location (b) was 32.9° C. Based on 85° C., temperature of the measurement location (a) was 112.1° C. and temperature of the measurement location (b) was 111.3° C. In the second preferred embodiment, based on 25° C., temperature of the measurement location (a) was 41.8° C. and temperature of the measurement location (b) was 40.6° C. Based on 85° C., temperature of the measurement location (a) was 139.3° C. and temperature of the measurement location (b) was 135.9° C. In the third preferred embodiment, based on 25° C., temperature of the measurement location (a) was 39.4° C. and temperature of the measurement location (b) was 37.5° C. Based on 85° C., temperature of the measurement location (a) was 125.9° C. and temperature of the measurement location (b) was 121.6° C.

The first preferred embodiment of the present invention is greatly improved in watertight structure in comparison with the structure that the hub and the end portion of the motor housing are not overlapped. Moreover, the second preferred embodiment is more improved in watertight structure than the first preferred embodiment, but in temperature evaluation, temperature of the stator of the blower motor of about 24° C. to 27° C. is increased based on 85° C. Furthermore, the third preferred embodiment is more improved in watertight structure than the second preferred embodiment, and in temperature evaluation, through the structure of the blade, temperature of the stator of the blower motor of about 13° C. to 14° C. is decreased based on 85° C.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. A blower unit of a two-layered air conditioner for a vehicle, which can divide and inhale indoor air and outdoor air, comprising:
    a scroll case disposed about and along an axis and having an upper passageway through which outdoor air introduced into a first inlet flows and a lower passageway through which indoor air introduced into a second inlet flows;
    a first blower wheel disposed in the upper passageway;
    a second blower wheel disposed in the lower passageway and arranged axially below the first blower wheel;
    a blower motor for rotating the first blower wheel and the second blower wheel; and
    a motor housing for covering the blower motor,
    wherein a hub is disposed on the second blower wheel at an axial top of the second wheel for radially guiding air inhaled in the axial direction through the second inlet,
    wherein an end portion of the motor housing is formed in a ring shape around a circumference of a rotary shaft of the blower motor to be spaced apart at a predetermined interval in the radial direction from the rotary shaft of the blower motor and has a partition wall shape extending axially upwardly, and
    wherein a lower end portion of the hub of the second blower wheel is overlapped axially with the end portion of the motor housing.

2. The blower unit of the two-layered air conditioner according to claim 1, wherein the end portion of the motor housing is arranged to be spaced apart at a predetermined interval along the outer circumference or the inner circumference of the hub of the second blower wheel in the radial direction.

3. The blower unit of the two-layered air conditioner according to claim 1, wherein the hub of the second blower wheel is spaced apart at a predetermined interval along the inner circumference of the second blower wheel and has a cylindrical shape of which the diameter gets smaller in a downward direction.

4. The blower unit of the two-layered air conditioner according to claim 2, wherein when the end portion of the motor housing is arranged outside the hub of the second blower wheel, the motor housing is formed to open at least one cooling hole for cooling the blower motor.

5. The blower unit of the two-layered air conditioner according to claim 4, wherein when the end portion of the motor housing is arranged inside the hub of the second blower wheel, the motor housing is formed to cover the cooling hole for cooling the blower motor.

6. The blower unit of the two-layered air conditioner according to claim 1, wherein the hub of the second blower wheel includes a blade.

7. The blower unit of the two-layered air conditioner according to claim 4, wherein the motor housing is formed to cover the at least one cooling hole for cooling the blower motor.

8. A blower unit of a two-layered air conditioner for a vehicle, which can divide and inhale indoor air and outdoor air, comprising:
    a scroll case having an upper passageway and a lower passageway;
    a first blower wheel disposed in the upper passageway;
    a second blower wheel disposed in the lower passageway and arranged below the first blower wheel;
    a hub disposed on the second blower wheel to guide air; and
    a blade disposed on the hub of the second blower wheel;
    wherein the blade extends radially and outwardly in a radial direction from the center of rotation of the hub, and
    wherein the blade is formed to be curved in a streamlined shape to be aligned with a curved direction of wings of the second blower wheel.

9. The blower unit of the two-layered air conditioner according to claim 8, further including a blower motor for rotating the first blower wheel and the second blower wheel, and wherein the blade extends radially toward an inner wall surface of the hub from a rotary shaft insertion hole to which a rotary shaft of the blower motor is inserted.

10. The blower unit of the two-layered air conditioner according to claim 7, wherein the at least one cooling hole is formed to expose and cool a stator of the blower motor.

11. The blower unit of the two-layered air conditioner according to claim 10, wherein the at least one cooling hole includes more than one cooling hole, wherein a plurality of the cooling holes are formed on an upper surface of the blower motor and spaced apart at a predetermined interval in a radial direction around the circumference of the rotary shaft of the blower motor, and
    wherein the end portion of the motor housing is positioned to the inside of the cooling holes in the radial direction.

12. The blower unit of the two-layered air conditioning unit according to claim 1, wherein the second inlet is located at an axial bottom of the second blower wheel to permit air to enter the lower passageway beneath the hub.

* * * * *